May 14, 1968          P. A. MÜLLER          3,383,449
METHOD FOR PRODUCING AN ENDLESS FILTER STRING
Original Filed April 28, 1955          2 Sheets-Sheet 1
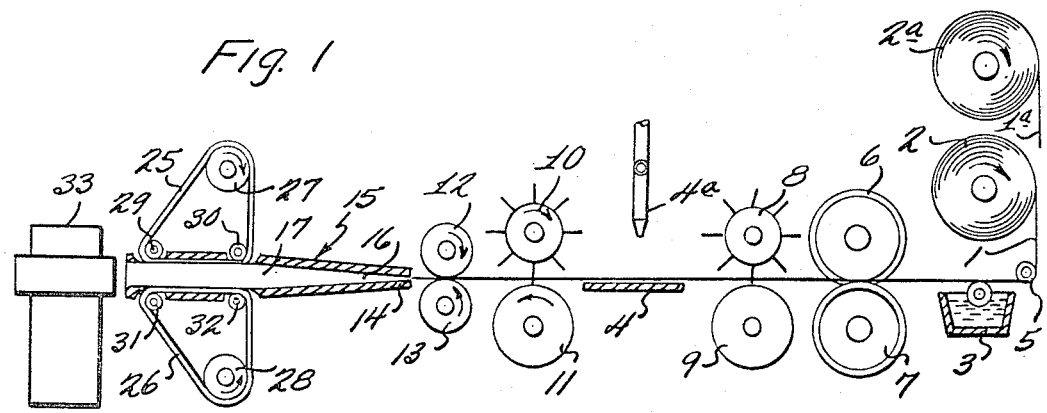
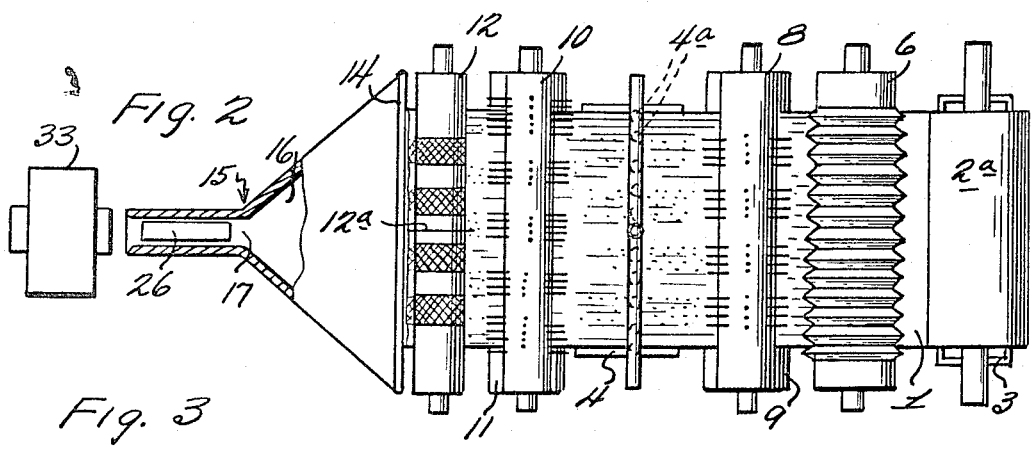
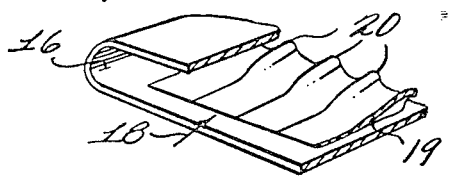
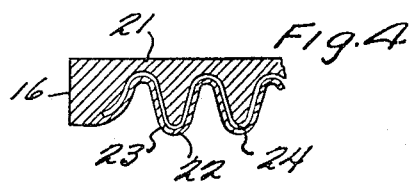
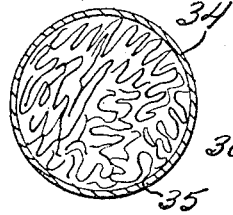
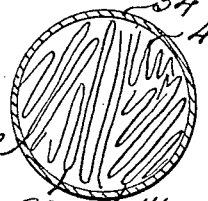
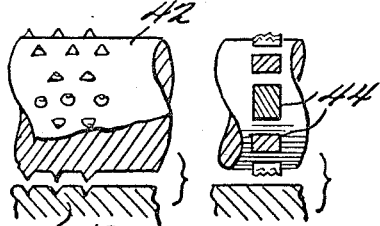
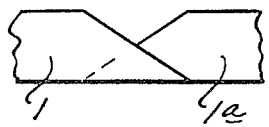
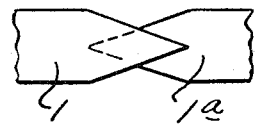
INVENTOR
PAUL A. MÜLLER
BY Cushman, Darby & Cushman
ATTORNEYS

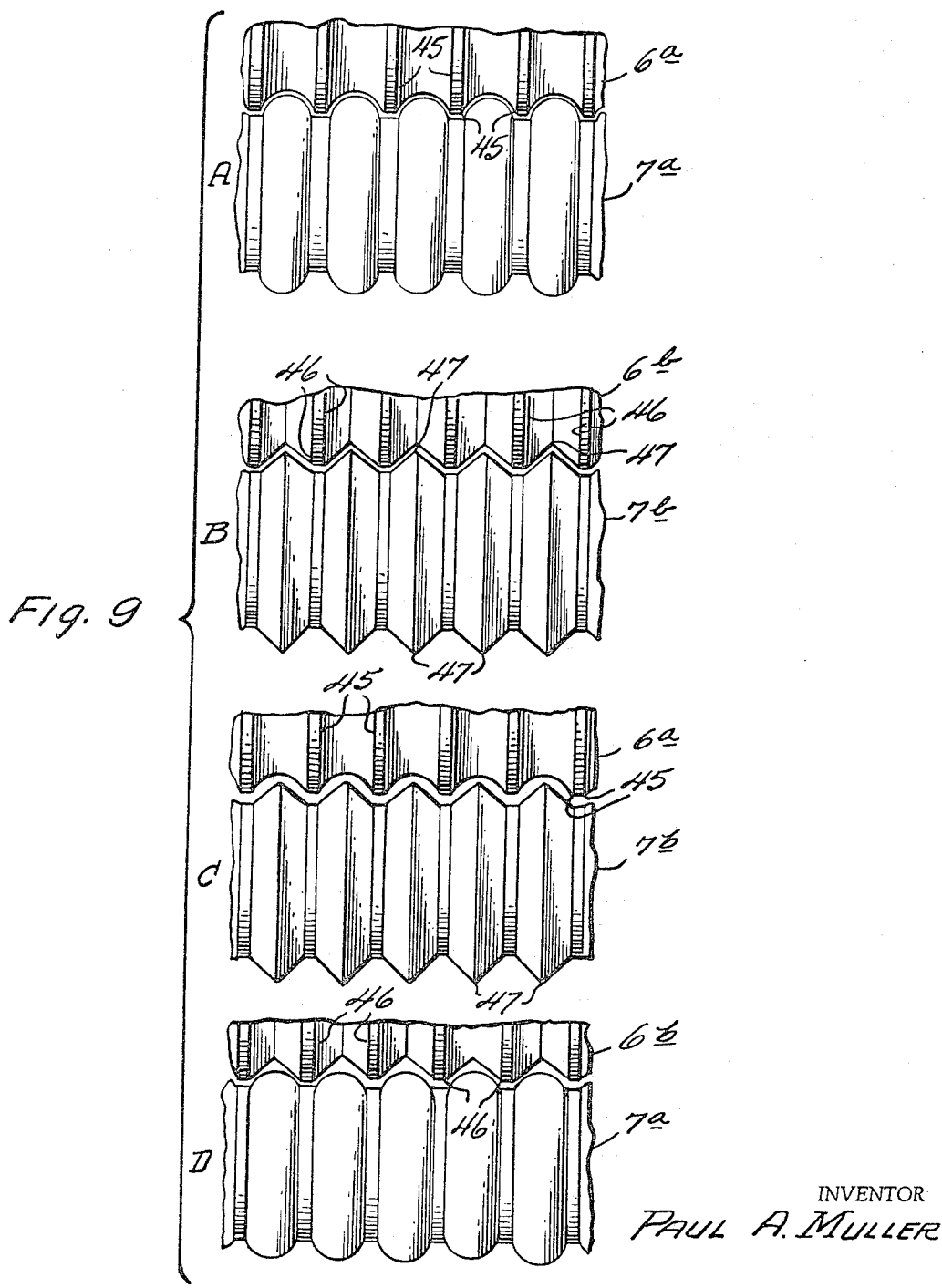

United States Patent Office 3,383,449
Patented May 14, 1968

3,383,449
METHOD FOR PRODUCING AN ENDLESS FILTER STRING
Paul Adolf Müller, Triesenberg 389, Liechtenstein
Application Apr. 24, 1964, Ser. No. 362,438, now Patent No. 3,226,280, dated Dec. 28, 1965, which is a division of application Ser. No. 504,647, Apr. 28, 1955, now Patent No. 3,161,557, dated Dec. 15, 1964, which in turn is a continuation-in-part of application Ser. No. 502,016, Apr. 18, 1955. Divided and this application Oct. 1, 1964, Ser. No. 400,860
3 Claims. (Cl. 264—287)

ABSTRACT OF THE DISCLOSURE

A process for treating paper strip material to both improve its effectiveness for use as a filter for filter-tip cigarettes and facilitate its being laterally gathered and shaped into a cylindrical filter string which can be cut into short sections to make filter plugs wherein the paper strip is moved along a path, moistened, thereafter continuously longitudinally corrugated while two narrow longitudinal zones along each corrugation are held against lateral displacement so that the paper therebetween is stretched, thereafter dried, and optionally flattened somewhat by a knurling operation.

---

The present invention relates to methods for producing an endless filter string or cord suitable for immediate subsequent processing in filter plug and cigarette machines, and pertains to developments and improvements in the invention disclosed in my application Ser. No. 447,478, now U.S. Patent No. 2,847,086, dated Aug. 12, 1958. This application is a division of my copending application Ser. No. 362,438, filed Apr. 24, 1964, now Patent No. 3,226,280, dated Dec. 28, 1965, which is a division of my copending application, Serial No. 504,647, filed Apr. 28, 1955, now Patent No. 3,161,557, granted Dec. 15, 1964, which is a continuation-in-part of my application Ser. No. 502,016, filed Apr. 18, 1955, now U.S. Patent No. 2,995,481, dated Aug. 8, 1961, which was a continuation-in-part of my application Ser. No. 447,478, filed Aug. 3, 1954, now Patent No. 2,847,086, granted Aug. 12, 1958.

Filter strings of the type with which this invention is concerned, and which consist as a rule of crimped paper, are already used for the production of filter plugs. In this connection, it is important for the filter plug and cigarette machine which processes the filter string that, as far as possible, an endless string of given uniform shape and size be fed to the machine, because high speed and smooth-running condition of the latter depend on uniformity of said endless string. The starting material, however, from which such filter strings usually are made, is not yet available in endless webs, but only in short or long strips. Such strips are formed, by way of example, from 66 centimeter wide webs of crimped paper with crimped grooves running transverse to the longitudinal direction of the web. Such webs are cut parallel to the crimped grooves into 4 centimeter wide strips; then several of these strips, four or five as a rule, are placed one on top of the other and fed in the longitudinal direction of the strips to a suitable forming device which produces from this multilayer web of strips a crimped paper string of the desired shape and size. Each string is, of course, only 66 centimeter long, which leads to undesirable difficulties in subsequent processing and always results in a certain number of defective filter plugs.

In order to produce an endless filter string from such strips, which are for instance 66 centimeter long, the suggestion has been made to stagger the superimposed individual strips in the longitudinal direction so that the points of junction of successive strips of one layer are in different places from the points of junction of adjacent layers. This does indeed result in an endless web of layered strips, but the latter have a plurality of junction points, which leads to filter plugs of varying quality and to rejects.

The further suggestion, to paste the individual superimposed strips together at the junction points either by hand or mechanically, does not solve the present problem either. For substantially different properties of the material, in respect of mechanical strength, porosity and absorptive capacity, result at the pasted junction points so that a certain number of filter plugs of varying quality cannot be avoided.

The present invention relates to a mechanical arrangement or plant for producing an endless filter spring of high uniformity which eliminates the above-mentioned disadvantages. The plant is characterized by driving a guide means for passing a virtually endless, at least single-layer web of material through deforming roller means arranged in series in the direction of feed or travel for altering the structure of the material. The roller means further comprises devices for longitudinally corrugating, i.e., producing crimped longitudinal grooves, at least in parts of the web of material. Also provided are folding and gathering means designed to reduce continuously the width of the web to an endless string of given shape and size, the string having a practically constant cross-section and being virtually free from junction points.

The expression "virtually free from junction points" refers to a filter string in which no junction points occur in lengths of some 50 or 500 metres. Since, naturally, the "vertually endless" web of material unwinding from a delivery roll and fed to the arrangement does end once the magazine is empty and must be joined to the beginning of a full magazine—for which special means are provided—such junction points are to be regarded as a rare occurrence, at any rate rare in comparison with the methods usual hitherto which resulted in fifty to a hundred junction points.

A few typical embodiments of the invention will now be explained in detail in conjunction with FIGURES 1 to 11 of the attached drawings, in which:

FIGURES 1 and 2 are side elevation and top plan views, respectively—both partly in section—of a typical embodiment according to the invention, shown in diagrammatic form;

FIGURES 3 and 4 are each fragmentary views of modifications of folding means embodying the invention, shown in perspective and cross-section, respectively;

FIGURES 5 and 6 are each cross-sectional views through typical embodiments of a filter string produced with the arrangement according to the invention, shown in diagrammatic form;

FIGURES 7, 8 and 9A, 9B, 9C, and 9D are each elevational views, some partly in section, through various typical embodiments of deforming rollers used in connection with the invention; and FIGURES 10 and 11 are each diagrammatic views of two overlapping webs of material.

The plant or apparatus illustrated in FIGURES 1 and 2 is, by way of example, designed for the production of an endless filter string formed of a web 1 of material, for instance absorbent paper, wound on a supply roll 2. The web 1 of a given width is unwound from the supply roll 2 and passes partially around a guide roller 5 to a moistening device 3, e.g., a roller running in a water bath.

After being made yielding by the moistening device 3, the web 1 is subjected to a continuous process of crimping and stretching, longitudinal grooves being produced such that two narrow zones of material are kept rigid along each groove and the central zone in-between is deformed. Owing to the lateral zones being kept rigid, the central zone can only be formed if the material in it is stretched at the same time. This process is carried out simultaneously on a plurality of parallel grooves by passing the softened web to and between a pair of treatment rollers 6, 7 which represent first deforming means.

These two rollers 6 and 7 have a plurality of interlocking circumferential stamping edges or ridges which are arranged along the length of the rollers and are so designed that the paper web 1 is provided with a corresponding number of longitudinal grooves or corrugations, the initial web width, however, being at least approximately maintained. This is accomplished by the provision of one or more relatively sharp circumferential edges on each stamping edge on at least one of rollers 6, 7, such relatively sharp edges serving to engage the web and substantially prevent transverse gathering thereof during its passage between the rollers. The lack of such gathering, of course, stretches the paper web 1 in a transverse direction, i.e., in the direction of the roller axes.

Such a stretching of the material produces a desired structural alteration of the said material, the paper fibers being pulled apart and, if the depth of the grooves or corrugations is sufficient, disconnected longitudinal cracks appearing in the web. Such a crimping or corrugating of the paper web in the longitudinal direction substantially increases the absorptive capacity of the paper, which is advantageous for the present purpose. The axial spacing and radial dimensions of the circumferential stamping edges or ridges and of the grooves therebetween, as well as their contours, can of course be selected as desired so as to obtain a finer or coarser, or shallower or deeper longitudinal crimping of the paper web.

The rollers 6 and 7 are preferably uniformly provided along their effective axial length with stamping ridges of the described type. It is, of course, also possible to provide only certain axial sections of the rollers with such stamping edges so that a paper web with longitudinally crimped and noncrimped strips lying next to one another will result.

The paper web 1, longitudinally crimped over its entire width in the typical embodiment according to FIGURES 1 and 2, then may be treated by a further pair of rollers 8 and 9, comprising a toothed roller 8 and a counter roller 9 provided with corresponding recesses, the said rollers serving to perforate the paper web 1. In the embodiment shown in FIGURES 1 and 2 only a few annular zones of the surface of the roller 8 are provided with perforating teeth, so that only four parallel longitudinal strips of the longitudinally crimped web of material 1 are perforated, and a nonperforated longitudinal strip lies on either side of each perforated strip. If desired, each of the rollers 8, 9 can be constructed to act as a toothed roller and a counter roller simultaneously, so that some of the perforation is effected from above and some from below. The perforating rollers 8 and 9 preferably are so designed that the edges of the individual perforation holes are frayed, which increases the filtering action of such a paper web.

The paper web 1, which is uniformly longitudinally crimped and perforated in strips is passed to and between another perforating pair of rollers 10, 11, similar to the rollers 8, 9, which represent a further deforming means. In this case the toothed roller 10 has perforating teeth in separate annular zones of its surface staggered with respect to the toothed zones on the roller 8, so that the web 1 is perforated in those longitudinal strips which have not been perforated by the pair of rollers 8, 9.

It is desirable that those longitudinal strips of the web perforated by the pair of rollers 10, 11 should not undergo any further treatment that might influence their structure and surface before passing into a folding and gathering means 15 in order that the frayed edges defining each perforation are not pressed down against the surface of the web. If, therefore, as in the present case, further deformation and treatment of the web by passage between a pair of knurled rollers 12, 13 is desired before the web passes into the inlet opening of the folding and gathering means 15, this deformation must concern the longitudinal strips not treated by the last pair of perforating rollers 10, 11. Accordingly, the knurling roller 12 has projecting irregularities only in those annular zones of its surfaces which effect a deformation of the longitudinal strips not perforated by the pair of rollers 10, 11. The irregularities of the knurling roller 12, and corresponding resilient collars on the counter roller 13, cause the structure of the web 1 to be compressed along the longitudinal strips perforated by the rollers 8, 9, while the longitudinal strips perforated by the rollers 10, 11 pass through the pair of rollers 12, 13 untouched.

In this way the inlet opening 14 of the folding and gathering means 15 is supplied with a web which consists of parallel longitudinal strips of varying structure, wherein a longitudinal strip of less mechanical strength but increased absorptive capacity and filtering efficiency is always adjacent a longitudinal strip of greater mechanical strength and lower swelling capacity.

If desired, before the web enters the folding and gathering device 15, it can be split up or cut into two or more parallel webs, for which purpose suitably arranged knife rollers can be provided. By way of example, the knurling roller 12 is fitted in the center with a knife-like cutting ring 12a, whereby the web is cut in the middle into two separate webs.

The web entering the folding and gathering device 15 should be as invariable as possible in its structure. If, for instance, the paper web 1 was made flexible before passing through the longitudinal crimping and transverse stretching rollers 6, 7 so as to give it adequate deformability for the subsequent deformation, it should be stiffened at a suitable point of the arrangement, to set therein the corrugations formed by the rollers, by means of appropriate after-treatment means so as to ensure that the properties of the filter string leaving the folding and gathering device 15 will not alter even over a long period of time.

By way of example, it has proved suitable with some harder kinds of paper to make the paper web flexible by moistening it with water with the device 3, with atomized water, or even aqueous steam, before it enters the rollers 6, 7. In this case the web of material, the structure of which has been altered by the rollers 6, 7 and 8, 9 must then be subjected to an appropriate after-treatment after leaving the pair of rollers 8, 9. It is possible to use for this purpose a smooth, electrically heated plate 4, for instance, over which the web 1 slides and is gently pressed thereagainst by means of compressed air discharged from nozzles 4a so as to free the web from undesirable moisture. If desired, it is also possible to achieve a reduction in the web width by means of air streams acting on the sides of the still easily deformable paper web. Following this, or another suitable after-treatment, the web 1 must at any rate be in such a condition that no changes in its structure need be feared over a long period of time.

The folding and gathering device 15 consists of a substantially flat funnel 16 which continuously decreases in width from the wide inlet opening 14 and merges into a nozzle-shaped channel 17, the cross-section of which corresponds to the desired shape and size of the endless filter string to be produced. The dimensions of the inlet opening 14 are conformed to the width and thickness of the web 1 so as to ensure that the latter enters the funnel 16 smoothly. The lateral gathering of the web 1 by means of the interior of the funnel, which narrows at the sides and increases in height, can be facilitated by the incorporation of folding means, two typical embodiments of which are illustrated in FIGURES 3 and 4.

FIGURE 3 shows a part of the flat funnel 16 immediately behind the inlet opening 14, the direction of arrow 18 indicating the direction of travel of the web 1 in the funnel 16. The underside of the funnel 16 is provided in this case with a ribbed plate 19 which has a series of ribs 20 running parallel in the direction of arrow 18, the height of which ribs increases in the direction of arrow 18, the distance between the said ribs decreasing, i.e., the ribs converge, as the flat funnel 16 narrows. Between the ribs 20 guide grooves are thus produced, by means of which the web passing over the ribbed plate 19 is regularly folded and laterally gathered.

In the case of the folding means seen in FIGURE 4 the top side 21 of the flat funnel 16 is designed, by way of example, as a ribbed plate with longitudinal ribs 22 and the underside 23 is so shaped that a corrugated funnel channel 24 is produced. The amplitude of the corrugations of the channel 24 increases in the direction of transit, i.e., the height of the ribs 22 increases while at the same time the distance between adjacent ribs 22 decreases, i.e., the ribs converge, which results in a progressive corrugation and gathering of the web passing through.

To overcome the friction which the web 1 undergoes during folding and gathering in the funnel 16, a feed device for the string is provided in the channel 17. This device consists, by way of example, of two endless conveyor belts 25 and 26 which are each driven by a driving wheel 27 and 28, respectively, pass over guide rollers 29, 30 and 31, 32, respectively, and each form at opposite points a part of the wall of the outlet channel 17. The speed of the conveyor belts 25, 26 is adjusted to the speed of the web 1 entering the flat funnel 16, which latter speed is determined by the aforesaid rollers 6, 7; 8, 9; 10, 11; and 12, 13.

On emerging from the nozzle-shaped channel 17 of the folding and gathering device 15 the endless filter string has the desired shape and size. The gathering process has compressed the material so that the filter string has a tendency to expand in a radial direction. In order to prevent this, the filter string is passed, after emerging from the folding and gathering device 15, through an apparatus 33 in which the string is encased in a known manner with a sheath or envelope, thus ensuring that the desired shape and size of the string will be maintained.

The resultant filter string is diagrammatically reproduced in cross-section in FIGURES 5 and 6. In a sheath 34 there is, in FIGURE 5, a crimped paper web 35 which has been folded several times, the gathering having been effected without special folding means of the type shown in FIGURES 3 and 4. FIGURE 6 shows a filter string which is produced by regular folding of four part webs 38, 39, 40, 41.

The roller deforming means indicated in the typical embodiment according to FIGURES 1 and 2 represent, of course, only some of the many possible kinds of such deforming means. By way of example, more than one pair of rollers with interlocking circumferential stamping edges can be arranged in series, as disclosed in my aforesaid Patent 2,995,481, in order to achieve an intensive longitudinal crimping. If, in this case, the axial distance between adjacent stamping edges is made smaller in each successive pair of rollers, the progressive grooving of the web 1 will be accompanied at the same time by a reduction of the width of said web, which is desirable with some materials that tolerate only slight stretching in a transverse direction. At least one roller of the successive roller pairs of the various deforming means is always driven. If, although the rollers have the same diameter, the following rollers are driven at a higher speed than the preceding rollers, the web will be additionally stretched in the longitudinal direction. The same effect can be achieved in the case of roller pairs rotating at the same speed by making the diameter of following roller pairs larger.

Besides the toothed rollers and knurling rollers, which are indicated in FIGURES 1 and 2, deforming rollers according to FIGURE 7 can also be used which consist of rollers 42 and 43 acting as a top and bottom stamping die respectively, it being possible to provide irregularities of any desired shape. In this case care should merely be taken to see that the distance in the circumferential direction between successive irregularities on the rollers is small in relation to 10 millimeters so as always to obtain an approximately equal number of such stampings per filter plug when the endless filter string is sub-divided into individual filter plugs. Surface zones of such deforming rollers can also be provided with oblique toothing 44, as indicated in FIGURE 8. In addition, various shapes and combinations of circumferential ridges and intermediate grooves can be selected for the longitudinal crimping rollers 6, 7, as indicated by the rollers 6a, 7a, 6b and 7b in FIGURE 9. Roller 6a is provided with circumferential ridges having relatively sharp edges 45 which engage the web to prevent any substantial lateral gathering thereof, while rollers 6b and 7b are provided with circumferential ridges having comparable edges 46 and 47, respectively. Finally, it is also possible to roughen the smooth surface zones of a web on one or both sides by means of suitable brush-type rollers (not shown).

As can be seen from the description of the arrangement according to FIGURES 1 and 2, as well as from the possible alternatives of the said arrangement, virtually endless filter strings can be successfully produced. Since the webs of material to be worked are, as a rule, fed from a supply roll, e.g., 2 in FIGURES 1 and 2, the arrangement must be stopped when the supply roll is used up and a new roll inserted. Since, however, such an interruption is in most cases undesirable, means can be provided which facilitate a simple transition from the end of the one supply roll to the beginning of the next.

For this purpose the arrangement concerned is equipped with an additional delivery roll 2a for the paper web in the typical embodiment according to FIGURES 1 and 2. Once the roll 2 with the paper web 1 has run out, the end of the paper web 1 from roll 2 is joined to the beginning of the paper web 1a on roll 2a and this latter supply roll is unwound, while the empty roll 2 is replaced by a full one and the process can be repeated inversely when the roll 2a has run out. It must, however, be ensured that the point of junction of the webs 1 and 1a, after passing through the deforming means and the folding and gathering device 15, yields the same thickness or quantity of material as the preceding and following section of the filter string in order to avoid rejects. For this purpose the material webs 1 and 1a are always joined by overlapping in such a way that at each transverse section of the overlap the total amount of material in the string is constant and equal to the amount of material in the sections of the material which do not overlap. Two typical embodiments are illustrated in FIGURES 10 and 11, in which the web ends are cut to a point and overlap only to such an extent that the pieces missing in the web 1 are exactly equal in area to the additional pieces present in the web 1a at the relevant point. It is advantageous to secure to the arrangement suitable cutting tools (not shown) arranged in mirror-picture fashion but similarly shaped, by means of which tools first the beginning of the spare roll and then the end unwinding from the empty roll are cut to the correct size, whereupon the beginning and the end are placed on top of one another, as can be seen from FIGURES 10 and 11, and conveyed together to the first deforming means. It is not necessary in this case to fasten the two webs together as the joint deformation of the two webs, particularly the perforation, ensures adequate adhesion.

What is claimed is:
1. A process of treating paper strip material to improve its qualities for being laterally gathered and shaped into a generally cylindrical string to be cut into plugs for use as filter for filter-tip cigarettes comprising: advancing paper strip material along a path; moistening the advancing strip material; continuously longitudinally corrugat- ing the advancing moistened strip material at a location along the path while maintaining against relative displacement two narrow longitudinal sections of the material along each corrugation, whereby the material between said sections is stretched laterally to loosen and release fibers; and drying the advancing corrugated strip material at a location along the path beyond the corrugating location to substantially set the corrugations in the material.

2. A process of treating paper strip material to improve its qualities for being laterally gathered and shaped into a generally cylindrical string to be cut into plugs for use as filter for filter-tip cigarettes comprising: advancing paper strip material along a path; moistening the advancing strip material; continuously longitudinally corrugating the advancing moistened strip material at a location along the path while maintaining against relative displacement two narrow longitudinal sections of the material along each corrugation, whereby the material between said sections is stretched laterally to loosen and release fibers; compressing the advancing corrugated and stretched material generally normal to its plane at a location along the path behind the corrugating location; and drying the advancing corrugated and stretched strip material at a location along the path beyond the corrugating location to substantially set the corrugations in the material.

3. A process of treating paper strip material to improve its qualities for being laterally gathered and shaped into a generally cylindrical string to be cut into plugs for use as filter for filter-tip cigarettes comprising: advancing paper strip material along a path; moistening the advancing strip material continuously longitudinally corrugating the advancing strip material at a location along the path while maintaining against relative displacement two narrow longitudinal sections of the material along each corrugation, whereby the material between said sections is stretched laterally to loosen and release fibers; knurling the advancing corrugated and stretched material at a location along the path behind the corrugating location; and drying the advancing corrugated and stretched strip material at a location along the path beyond the corrugating location to substantially set the corrugations in the material.

References Cited
UNITED STATES PATENTS

| | | | |
|---|---|---|---|
| 1,550,084 | 8/1925 | Lorenz | 156—594 |
| 1,661,393 | 3/1928 | Stickney | 156—592 |
| 2,164,702 | 7/1939 | Davidson | 93—1 |
| 2,628,656 | 2/1953 | Stevenson | 264—282 |
| 2,954,036 | 9/1960 | Schur | 156—201 X |
| 3,238,852 | 3/1966 | Schur | 93—1 |

ROBERT F. WHITE, *Primary Examiner.*

ROY B. MOFFITT, *Examiner.*

R. R. KUCIA, *Assistant Examiner.*

Dedication 3,383,449.—*Paul Adolf Müller*, Triesenberg, Liechtenstein. METHOD FOR PRODUCING AN ENDLESS FILTER STRING. Patent dated May 14, 1968. Dedication filed May 17, 1968, by the inventor.

Hereby dedicates to the Public the terminal portion of the term of said patent subsequent to Apr. 20, 1982.

[*Official Gazette October 15, 1968.*]